United States Patent
Wagoner et al.

(10) Patent No.: US 10,103,663 B1
(45) Date of Patent: Oct. 16, 2018

(54) CONTROL METHOD FOR PROTECTING SWITCHING DEVICES IN POWER CONVERTERS IN DOUBLY FED INDUCTION GENERATOR POWER SYSTEMS

(71) Applicant: General Electric Company, Schenectady, NY (US)

(72) Inventors: Robert Gregory Wagoner, Roanoke, VA (US); Cornelius Edward Holliday, III, Forest, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/489,919

(22) Filed: Apr. 18, 2017

(51) Int. Cl.
| | | |
|---|---|---|
| H02P 9/00 | (2006.01) | |
| H02P 3/00 | (2006.01) | |
| F03D 9/25 | (2016.01) | |
| H02M 5/458 | (2006.01) | |
| H02H 7/12 | (2006.01) | |
| H02P 101/15 | (2016.01) | |

(52) U.S. Cl.
CPC .............. *H02P 9/007* (2013.01); *F03D 9/257* (2017.02); *H02H 7/1216* (2013.01); *H02M 5/4585* (2013.01); *H02P 3/00* (2013.01); *H02P 2101/15* (2015.01)

(58) Field of Classification Search
USPC ............................................ 322/61; 290/44
See application file for complete search history.

(56) References Cited

U.S. PATENT DOCUMENTS

| | | | | |
|---|---|---|---|---|
| 7,006,366 B2* | 2/2006 | Panda | ................. | H02M 1/4216 363/70 |
| 7,411,309 B2* | 8/2008 | Hudson | ................. | F03D 7/0272 290/44 |
| 7,423,412 B2* | 9/2008 | Weng | ..................... | H02P 9/007 290/40 R |
| 7,425,771 B2* | 9/2008 | Rivas | .................... | F03D 7/0224 290/44 |
| 7,586,216 B2* | 9/2009 | Li | ........................ | F03D 7/0248 307/151 |

(Continued)

FOREIGN PATENT DOCUMENTS

| | | |
|---|---|---|
| EP | 1997221 B1 | 10/2013 |
| WO | WO2012/104580 A2 | 8/2012 |

*Primary Examiner* — Pedro J Cuevas
(74) *Attorney, Agent, or Firm* — Dority & Manning, P.A.

(57) ABSTRACT

Systems and methods for protecting switching devices in a power converter in doubly fed induction generator power systems are provided. A DFIG system can include a DFIG generator and a power converter comprising a line side converter and a rotor side converter connected by a DC bus. Each of the line side converter and rotor side converter can include a plurality of bridge circuits. Each bridge circuit can include a plurality of switching devices. A method can include monitoring, by a control device, a voltage of the DC bus of the power converter. The method can further include implementing, by the control device, a switching device protection measure based at least in part on the voltage of the DC bus of the power converter. The switching device protection measure can be operable to protect the switching devices by operating the switching devices within a safe operating area.

14 Claims, 6 Drawing Sheets

(56) References Cited

U.S. PATENT DOCUMENTS

| | | | |
|---|---|---|---|
| 7,629,705 B2 * | 12/2009 | Barker | H02P 9/007 290/55 |
| 8,093,741 B2 * | 1/2012 | Ritter | H02J 3/386 290/44 |
| 8,183,704 B2 | 5/2012 | Rivas et al. | |
| 8,198,742 B2 * | 6/2012 | Jorgensen | F03D 7/0224 290/44 |
| 8,207,623 B2 | 6/2012 | Rivas et al. | |
| 8,258,642 B2 * | 9/2012 | Koerber | F03D 7/0284 290/44 |
| 8,264,094 B2 | 9/2012 | Rivas et al. | |
| RE43,698 E * | 10/2012 | Hudson | F03D 7/0272 290/44 |
| 8,294,288 B2 | 10/2012 | Rivas et al. | |
| 8,541,997 B2 * | 9/2013 | Jiang | H02M 3/33507 323/277 |
| 8,593,114 B2 | 11/2013 | Park et al. | |
| 8,664,788 B1 | 3/2014 | Wagoner et al. | |
| 8,669,669 B1 * | 3/2014 | Wagoner | H02P 9/007 290/44 |
| 8,853,876 B1 * | 10/2014 | Wagoner | F03D 7/0276 290/44 |
| 8,890,363 B2 * | 11/2014 | Aiello | H02J 1/102 307/82 |
| 8,897,040 B2 * | 11/2014 | Holliday | H02H 9/04 363/37 |
| 8,907,510 B2 | 12/2014 | Wagoner et al. | |
| 8,975,768 B2 | 3/2015 | Wagoner et al. | |
| 9,172,311 B2 * | 10/2015 | Jussila | H02M 7/483 |
| 9,263,962 B2 * | 2/2016 | Yang | H02M 5/42 |
| 9,369,076 B2 | 6/2016 | Xu et al. | |
| 9,577,421 B2 * | 2/2017 | Barker | H02H 3/16 |
| 9,654,021 B2 * | 5/2017 | Wei | H02M 5/4585 |
| 9,780,709 B2 * | 10/2017 | Hardwicke, Jr. | H02P 9/007 |
| 2007/0177314 A1 * | 8/2007 | Weng | H02P 9/007 361/20 |
| 2007/0273155 A1 * | 11/2007 | Barton | H02J 3/1892 290/44 |
| 2007/0279815 A1 * | 12/2007 | Li | F03D 7/0248 361/54 |
| 2009/0206606 A1 * | 8/2009 | Jorgensen | F03D 7/0224 290/44 |
| 2010/0133831 A1 * | 6/2010 | Scholte-Wassink | F03D 7/0292 290/44 |
| 2010/0140939 A1 * | 6/2010 | Scholte-Wassink | F03D 7/0224 290/44 |
| 2011/0101689 A1 * | 5/2011 | Larsen | H02P 9/007 290/44 |
| 2011/0140430 A1 * | 6/2011 | Ritter | H02J 3/386 290/44 |
| 2012/0139243 A1 * | 6/2012 | Koerber | F03D 7/0284 290/44 |
| 2013/0038061 A1 | 2/2013 | Rivas et al. | |
| 2013/0234435 A1 * | 9/2013 | Wagoner | H02P 9/007 290/44 |
| 2013/0307271 A1 * | 11/2013 | Langel | H02J 3/386 290/44 |
| 2014/0103651 A1 | 4/2014 | Grinblat | |
| 2015/0252784 A1 | 9/2015 | Seymour et al. | |
| 2015/0327481 A1 | 11/2015 | Lussenden | |
| 2016/0118786 A1 | 4/2016 | Zhu et al. | |
| 2016/0128231 A1 | 5/2016 | Wagoner et al. | |

\* cited by examiner

CONTROL METHOD FOR PROTECTING SWITCHING DEVICES IN POWER CONVERTERS IN DOUBLY FED INDUCTION GENERATOR POWER SYSTEMS

FIELD

The present subject matter relates generally to power systems, and more particularly to systems and methods for protecting switching devices in power converters used in doubly fed induction generator power systems.

BACKGROUND

Wind turbines have received increased attention as a renewable energy source for generating electricity. Wind turbine power systems, such as doubly fed induction generator (DFIG) power systems, often include a power converter with a regulated DC bus. For example, a DFIG power system can include a power converter with a rotor side converter and a line side converter coupled together via a DC bus.

In a typical configuration, the rotor side converter and the line side converter can each include a plurality of bridge circuits, which can include switching devices, such as insulated gate bipolar transistors ("IGBTs"). The IGBTs or other switching devices in the rotor converter can be switched to convert AC power from the rotor of the DFIG to a DC power, which can be provided to the DC bus. The IGBTs or other switching devices in the line side converter can similarly be switched to convert the DC power from the DC bus to an AC power, such as a synchronous AC power, which can then be provided to an electrical grid.

However, the DFIG power system may be exposed to transient voltages, such as during grid disturbances, which can cause oscillations of power into and out of the power converter. This can cause the DC bus voltage to oscillate. In a typical protection scheme, when the DC bus voltage exceeds an overvoltage threshold, the power converter is shut down in order to protect the switching devices. However, shutting down the power converter to protect the switching devices can limit the availability of the DFIG power system, and reduce the amount of power generated by the DFIG power system.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for operating a power converter in a doubly-fed induction generator (DFIG) system. The DFIG system can include a DFIG generator and a power converter comprising a line side converter and a rotor side converter connected by a DC bus. Each of the line side converter and rotor side converter can include a plurality of bridge circuits. Each bridge circuit can include a plurality of switching devices. The method can include monitoring, by a control device, a voltage of the DC bus of the power converter. The method can further include implementing, by the control device, a switching device protection measure based at least in part on the voltage of the DC bus of the power converter. The switching device protection measure can be operable to protect the switching devices by operating the switching devices within a safe operating area.

Another example aspect of the present disclosure is directed to a control system for a doubly-fed induction generator (DFIG) system. The DFIG system can include at least a DFIG generator and a power converter comprising a line side converter and a rotor side converter connected by a DC bus. Each of the line side converter and rotor side converter can include a plurality of bridge circuits. The control system can include a control device configured to perform operations. The operations can include determining a voltage of the DC bus. The operations can further include determining a current limit for at least one bridge circuit in the power converter based at least in part on the voltage of the DC bus. The operations can further include controlling the at least one bridge circuit in the power converter based at least in part on the current limit. When a current flowing through the at least one bridge circuit in the power converter exceeds the current limit, controlling the at least one bridge circuit in the power converter based at least in part on a current limit can include disabling the at least one bridge circuit.

Another example aspect of the present disclosure is directed to a doubly fed induction generator (DFIG) system. The DFIG system can include a DFIG generator and a power converter comprising a line side converter and a rotor side converter connected by a DC bus. Each of the line side converter and rotor side converter can include a plurality of bridge circuits. Each bridge circuit can include a plurality of switching devices. The DFIG system can further include a dynamic brake connected to the DC bus. The DFIG system can further include a control device configured to perform operations. The operations can include monitoring a voltage of the DC bus of the power converter. The operations can further include controlling each of the line side converter, the rotor side converter, and the dynamic brake to a respective operational state based at least in part on the voltage of the DC bus. The operational state for the line side converter and the rotor side converter can be either an on state or an off state. When operated in the on state, switching can be enabled in the plurality of bridge circuits of the respective converter. When operated in the off state, switching can be disabled in the plurality of bridge circuits of the respective converter. The operational state for the dynamic brake can be either a braking state or a non-braking state. Energy on the DC bus can be dissipated in the dynamic brake in the braking state. Energy on the DC bus is not dissipated in the dynamic brake on the non-braking state.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
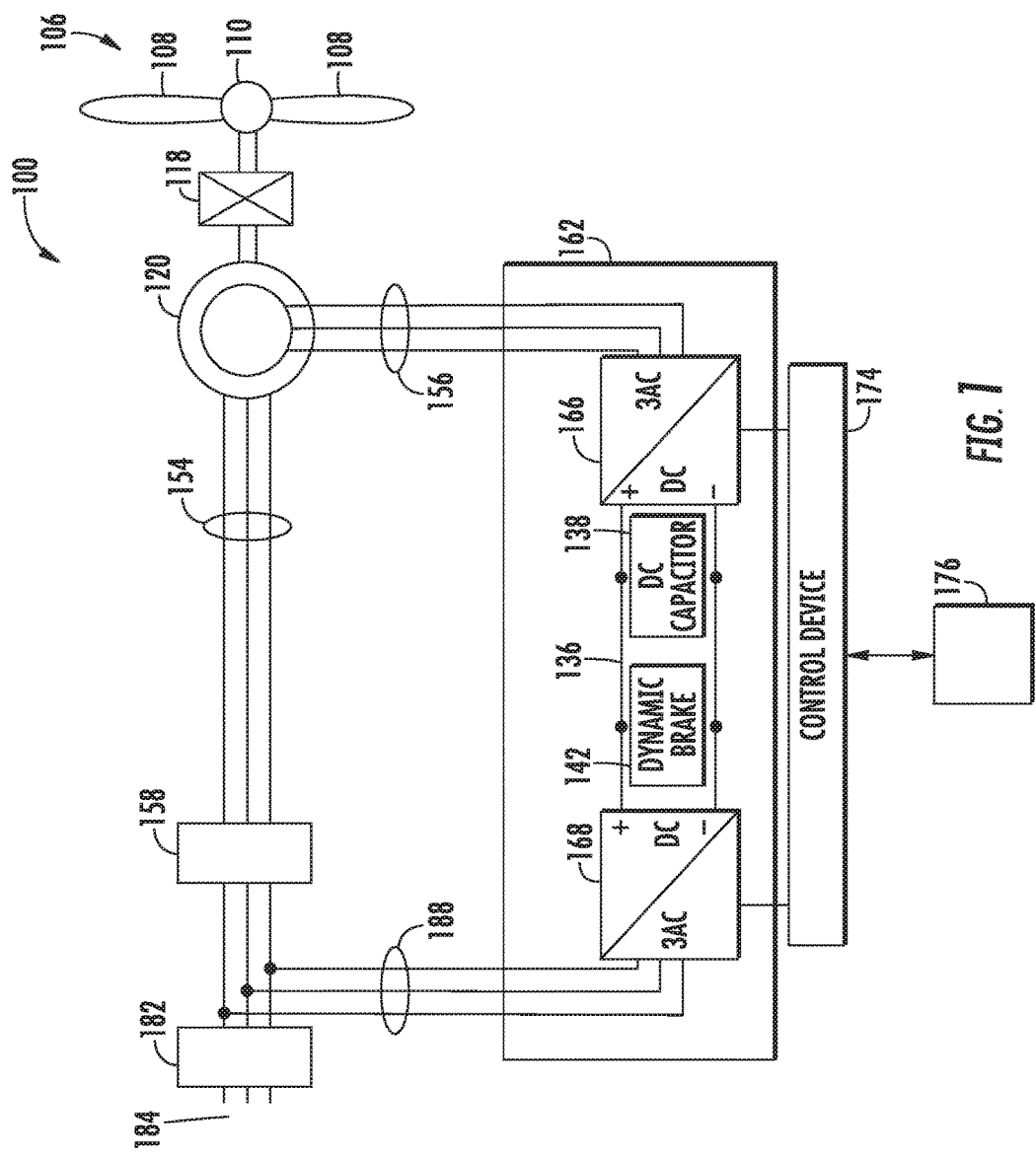
FIG. 1 depicts an example DFIG power system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third," etc. may be used interchangeably to distinguish one component from another and are not intended to signify location or importance of the individual components or limit the number of individual components in an apparatus. As used herein, the term "approximately" when used in reference to a voltage means within 25 volts of the stated value. As used in the specification and the appended claims, the singular forms "a," "an," and "the" include plural referents unless the context clearly dictates otherwise.

Example aspects of the present disclosure are directed to systems and methods for protecting the IGBTs or other switching devices in a line side converter or a rotor side converter in a DFIG power system. For example, a DFIG power system can include a DFIG as a power generation unit. The stator of the DFIG can be synchronously connected to an electrical grid, and the rotor of the DFIG can be coupled to a power converter. For example, the power converter can include a rotor side converter and a line side converter. The rotor side converter can be configured to receive a multiphase (e.g., three-phase) AC power, and can be configured to convert the AC power to a DC power by switching one or more bridge circuits in the converter. For example, each bridge circuit can include at least two switching devices, such as IGBT switching devices, which can be controlled by a control device. Power can be provided to the switching devices, and switching of the switching devices can convert the AC power to a DC power. The DC power can be provided to a DC bus in the power converter, whereby the DC power can be provided to the line side converter. Similar to the rotor side converter, the line side converter can include a plurality of bridge circuits, which can be modulated to convert the DC power from the DC bus to an AC power, such as an AC power synchronous with a grid frequency (e.g., 50/60 Hz). The AC power at the electrical grid frequency can then be provided to an electrical grid, such as, for example, by stepping up the voltage of the AC power to match a grid voltage.

According to example aspects of the present disclosure, the IGBTs or other switching devices in a power converter can be protected by a switching device protection measure in order to prevent the switching devices from being exposed to a voltage or current that exceeds an operational capability of the switching devices. For example, a method can include monitoring, by a control device, a voltage of the DC bus of the power converter. For example, a voltage sensor can be configured to take periodic measurements of the voltage across the DC bus, and can be configured to provide one or more signals indicative of a voltage to a control device. The control device can be configured to implement a switching device protection measure based at least in part on the voltage of the DC bus of the power converter. The switching device protection measure can be operable to protect the switching devices by operating the switching devices within a safe operating area. As used herein, the term "safe operating area" refers to the voltage and current conditions over which the device can be expected to operate without self-damage.

For example, the DFIG system can include a dynamic brake connected to the DC bus of the power converter. The dynamic brake can be configured to dissipate energy on the DC bus when the dynamic brake is operated in a braking state. When the dynamic brake is not operated in a braking state (i.e., the dynamic brake is in a non-braking state), energy on the DC bus is not dissipated in the dynamic brake. The control device can be configured to implement a switching device protection measure based at least in part on the voltage of the DC bus of the power converter by controlling each of the line side converter, the rotor side converter, and the dynamic brake to a respective operational state based at least in part on the voltage of the DC bus. For example, both the line side converter and the rotor side converter can be operated in either an on state or an off state. In the on state, switching can be enabled in the plurality of bridge circuits in the respective converter. When operated in the off state, switching can be disabled in the plurality of bridge circuits in the respective converter. When operated in the off state, anti-parallel diodes across the IGBTs can still carry current.

According to example aspects of the present disclosure, when the DC bus voltage is below a first threshold, the control device can control the rotor side converter and the line side converter to an on state, and can control the dynamic brake to a non-braking state. The first threshold can be, for example, approximately 1175 V. When the DC bus voltage exceeds a second threshold, the control device can control the rotor side converter to an off state, and can control the dynamic brake to a braking state. For example, switching of the IGBTs or other switching devices in the rotor side converter can be stopped, and energy on the DC bus can be dissipated in the dynamic brake. The second threshold can be greater than the first threshold. For example, the second threshold can be a threshold of approximately 1225 V.

While the dynamic brake is operated in the braking state, energy on the DC bus will be dissipated in the dynamic brake, which can lower the voltage of the DC bus. When the DC bus voltage drops below a third threshold, the control device can control the rotor side converter back to an on state, and can control the dynamic brake to the non-braking state. The third threshold can be greater than the first threshold, but less than the second threshold. For example, the third threshold can be approximately 1200 V. As energy on the DC bus is dissipated in the dynamic brake, and the voltage on the DC bus drops, once the voltage has dropped a sufficient amount (i.e., the DC bus voltage drops below the third threshold), the rotor side converter can be controlled back to the on state, and the dynamic brake can be controlled to the non-braking state.

While the dynamic brake is operating, if the DC bus voltage is less than or equal to a fourth threshold, the control device can control the line side converter to the on state. The fourth threshold can be, for example, a threshold greater than the second threshold. For example, the fourth threshold can be approximately 1275 V. When the DC bus voltage is less than the fourth threshold, the line side converter can be continued to be operated in an on state in order to continue to convert DC power on the DC bus to an AC power at a grid frequency.

However, if the DC bus voltage exceeds the fourth threshold, in order to protect the IGBTs or other switching devices in the line side converter, the control device can control the line side converter to an off state. In the off state, switching in the switching devices in the line side converter can be disabled in order to prevent the switching devices from being exposed to a voltage greater than the operational limit of the switching devices.

As energy in the DC bus is dissipated in the dynamic brake, once the DC bus voltage drops below a fifth threshold, the control device can control the line side converter back to the on state. The fifth threshold can be greater than the second threshold and less than the fourth threshold. For example, the fifth threshold can be approximately 1250 V. Once the voltage drops from the fourth threshold to the fifth threshold, the line side converter can be turned back to the on state.

According to additional example aspects of the present disclosure, implementing a switching device protection measure based at least in part on the voltage of the DC bus of the power converter by the control device can include determining a current limit for at least one bridge circuit in the power converter based at least in part on the voltage of the DC bus, and controlling the at least one bridge circuit in the power converter based at least in part on the current limit. For example, when a current flowing through the at least one bridge circuit in the power converter exceeds the current limit, controlling the at least one bridge circuit in the power converter based at least in part on the current limit can include disabling the at least one bridge circuit. For example, disabling the at least one bridge circuit can include disabling the switching devices in the at least one bridge circuit so that they do not switch (e.g., by not providing the switching device a switching command). Thus, the current limit can be determined based on the voltage of the DC bus, and switching in the IGBTs or other switching devices in the at least one bridge circuit can be controlled based on the current limit.

According to additional example aspects of the present disclosure, when the voltage of the DC bus is a voltage less than or equal to a sixth threshold, determining a current limit for at least one bridge circuit in the power converter can include setting the current limit at a first current limit. For example, the first current limit can correspond to a current limit for the IGBTs in the at least one bridge circuit based on operational constraints of the IGBTs. The first current limit can be, for example, a current limit obtained from a product specification sheet based on the physical characteristics of the IGBTs used in the at least one bridge circuit.

According to additional example aspects of the present disclosure, when the voltage of the DC bus is a voltage greater than the first threshold, determining a current limit for at least one bridge circuit in the power converter can include setting the current limit for the at least one bridge circuit at a second current limit, wherein the second current limit is a current limit less than the first current limit. For example, as the voltage on the DC bus increases, the current limit for the at least one bridge circuit can be reduced in order to limit the total power flow through the IGBTs or other switching devices in the at least one bridge circuit. In an embodiment, the value of the second current limit can be determined based at least in part on the voltage of the DC bus. For example, the value of the second current limit can be determined based on a step change function, a linear relationship, an exponential relationship, or another relationship such that the second current limit is dependent upon the voltage on the DC bus. For example, when the voltage of the DC bus exceeds the sixth threshold, a linear relationship between the voltage of the DC bus and a current limit can be used to reduce the value of the second current limit based at least in part on the voltage of the DC bus.

According to additional aspects of the present disclosure, determining a current limit for at least one bridge circuit in the power converter can be further based at least in part on a temperature feedback or a current feedback. For example, a temperature feedback can include a baseplate temperature feedback as measured by one or more temperature sensing devices. Additionally, a temperature feedback can be, for example, a modeled temperature feedback based on known relationships between voltage, current, power, and other measured properties of the power converter and the effect of those properties on the temperature of the individual components in the power converter.

According to additional aspects of the present disclosure, when the voltage of the DC bus exceeds a seventh threshold, controlling the at least one bridge circuit in the power converter based at least in part on the current limit can include disabling the at least one bridge circuit. For example, if the voltage exceeds the seventh threshold, the at least one bridge circuit can be disabled such that switching does not occur in the at least one bridge circuit. In this way, current can only flow through the bridge circuit when the voltage peaks of AC power provided by the rotor exceed a threshold thereby causing a current to flow through an antiparallel diode coupled to a switching device in the at least one bridge circuit.

According to additional aspects of the present disclosure, a current limit can be determined for each bridge circuit in the power converter, such as each bridge circuit in a line side converter and a rotor side converter. Further, the control device can control each bridge circuit in the power converter based on the respective current limit for that bridge circuit.

In this way, the systems and methods according to example aspects of the present disclosure can have a technical effect of allowing for the switching devices in a power converter to be protected in a dynamic way based on operating conditions of the power converter. Further, the DC overvoltage limit for a power converter can be increased, which can result in allowing a power converter to be operated through grid events which would have previously caused a trip. This can increase the availability of the DFIG system, and can potentially increase the power production from the DFIG system. Further, this can increase the amount of power that can be processed by an existing converter, which can lead to a cost reduction as less expensive components can be used to achieve a particular power rating.

With reference now to the figures, example aspects of the present disclosure will be discussed in greater detail. FIG. 1 depicts a DFIG system 100 according to example aspects of the present disclosure, which includes a DFIG 120. The present disclosure will be discussed with reference to the example DFIG system 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example DFIG system 100, a rotational component 106 includes a plurality of rotor blades 108 coupled to a rotating hub 110. The rotational component 106 is coupled to an optional gear box 118, which is, in turn, coupled to a generator 120. In accordance with aspects of the present disclosure, the generator 120 is a doubly fed induction generator (DFIG) 120.

DFIG 120 can include a rotor and a stator. The DFIG 120 is typically coupled to a stator bus 154 and a power converter 162 via a rotor bus 156. The stator bus provides an output multiphase power (e.g. three-phase power) from a stator of DFIG 120 and the rotor bus 156 provides a multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188. In various embodiments, a transformer (not shown) can be coupled to line side bus 188 to convert the AC power from the line side bus to a voltage suitable for application to an electrical grid 184.

In example configurations, the rotor side converter 166 and the line side converter 168 are configured for operating using pulse width modulation (PWM) arrangement of IGBT switching devices or other switching devices. The rotor side converter 166 and the line side converter 168 can be coupled via a DC bus 136 across which is the DC link capacitor 138. A dynamic brake 142 can also be connected to the DC bus 136.

The power converter 162 can be coupled to a control device 174 to control the operation of the rotor side converter 166 and the line side converter 168. It should be noted that the control device 174, in typical embodiments, is configured as an interface between the power converter 162 and a control system 176.

The control device 174 can similarly be configured to control operation of the dynamic brake 142. The dynamic brake 142 can include, for example, a switch such as an IGBT and a resistor in series with the switch. The control device 174 can be configured to control operation of the dynamic brake in order to allow a current to pass through the switch and for energy to be at least partially dissipated by the resistor of the dynamic brake. In this way, the control device 174 can control the dynamic brake 142 between a "braking state" in which energy is dissipated in the dynamic brake 142, and a "non-braking state" in which energy is not dissipated in the dynamic brake 142. In the "braking state," the dynamic brake can be operated in, for example, a PWM mode, wherein energy is dissipated according to a duty-cycle. For example, at a 50% duty cycle, the dynamic brake can dissipate energy approximately 50% of the time. A "braking state" can further include a fully on mode (i.e., a duty cycle of 100%).

In some configurations, various line contactors and circuit breakers including, for example, cluster breaker 182, rotor bus breaker 158, line bus contactor 172, and line bus breaker 186 can be included for isolating various components as necessary for normal operation of DFIG 120 during connection to and disconnection from a cluster network 184. A line bus breaker 186 can couple the system bus 160 to transformer 180, which is coupled to the cluster network 184 via grid breaker 182.

In operation, power generated at DFIG 120 by rotating the rotational component 106 is provided via a dual path to cluster network 184. The dual paths are defined by the stator bus 154 and the rotor bus 156. On the rotor bus side 156, sinusoidal multi-phase (e.g. three-phase) AC power is provided to the power converter 162. The rotor side power converter 166 converts the AC power provided from the rotor bus 156 into direct current ("DC") power and provides the DC power to the DC bus 136. Switching devices (e.g. IGBTs) used in parallel bridge circuits of the rotor side power converter 166 can be modulated to convert the AC power provided from the rotor bus 156 into DC power suitable for the DC bus 136.

The line side converter 168 converts the DC power on the DC bus 136 into AC power, which is provided to the line side bus 188. In particular, switching devices (e.g. IGBTs, MOSFETs, etc.) used in bridge circuits of the line side power converter 168 can be modulated to convert the DC power on the DC bus 136 into AC power on the line side bus 188. Transformer 180 can convert the AC power at a first voltage from the line side bus 188 to AC power at a second voltage, such as the voltage of power on the stator bus 154. The AC power from the power converter 162 can be combined with the power from the stator of DFIG 120 to provide multi-phase power (e.g. three-phase power) having a frequency maintained substantially at the frequency of the cluster network 184 (e.g. 50 Hz/60 Hz).

The power converter 162 can receive control signals from, for instance, the control system 176 via the control device 174. The control signals can be based, among other things, on sensed conditions or operating characteristics of the DFIG system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the control device 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 2:
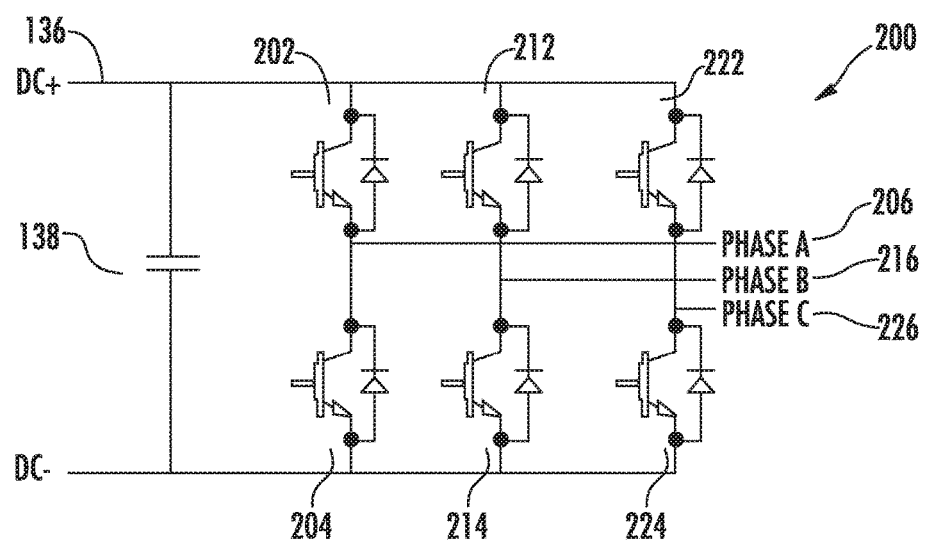
FIG. 2 depicts an example power converter configuration according to example aspects of the present disclosure.

Referring now to FIG. 2, an example bi-directional AC to DC or DC to AC power converter 200 according to example aspects of the present disclosure is depicted. Bi-directional AC to DC power converter 200 can be used, for example, as a rotor side converter 166 or a line side converter 168. As shown, bi-directional AC to DC power converter 200 is a three-phase AC to DC power converter capable of bi-directional power flow. One of ordinary skill in the art will recognize that any suitable bi-directional AC to DC power converter can be used as a rotor side converter 166 or a line side converter 168. Bi-directional power converter 200 can include a plurality of switching devices, such as IGBTs, MOSFETs, or other switching devices. For example, bi-directional AC to DC power converter 200 can include a plurality of bridge circuits, one for each phase of a multi-phase AC power output. For example, for a three-phase power output, three bridge circuits can be included in a bi-directional power converter 200, wherein each bridge circuit includes two switching devices (e.g., IGBTs). Each switching device can include an anti-parallel diode coupled to the switching device. As depicted in FIG. 2, a first bridge circuit can include a first IGBT 202 and a second IGBT 204 for phase A 206 of a three phase output, a second bridge circuit can include a third IGBT 212 and a fourth IGBT 214 for phase B 216 of a three phase output, and a third bridge circuit can include a fifth IGBT 222 and a sixth IGBT 224 for phase C 226 of a three phase output. As shown, a dc bus capacitor 138 can be connected across the DC bus 136. While FIG. 2 makes reference to IGBT switching devices, one of ordinary skill in the art will recognize that other switching devices (e.g., MOSFETs) can be similarly used.

Switching commands can be provided by a control device or control system, such as a control device 174 or control system 176, which can control the switching of the switching devices to convert DC power to a three phase AC power and vice-versa. In example configurations, PWM switching commands can be provided to the switching devices. During operation, the bi-directional AC to DC power converter 200 can be operated in an on state or an off state. When operated in the on state, switching can be enabled in the plurality of bit bridge circuits. For example, the switching devices in the bridge circuits associated with phase A 206, phase B 216, and phase C 226 can be provided switching commands by a control device 174. Conversely, in the off state, switching can be disabled in the plurality of bridge circuits. While in the off state, a current can still flow in the anti-parallel diodes during certain conditions. For example, in a rotor side converter 166, when the AC voltage peaks of power provided by the rotor exceed the voltage of the DC bus 136, a current can flow through the diodes. The diodes can rectify the rotor voltage into the capacitor 138 of the DC bus 136.

Figure 3:
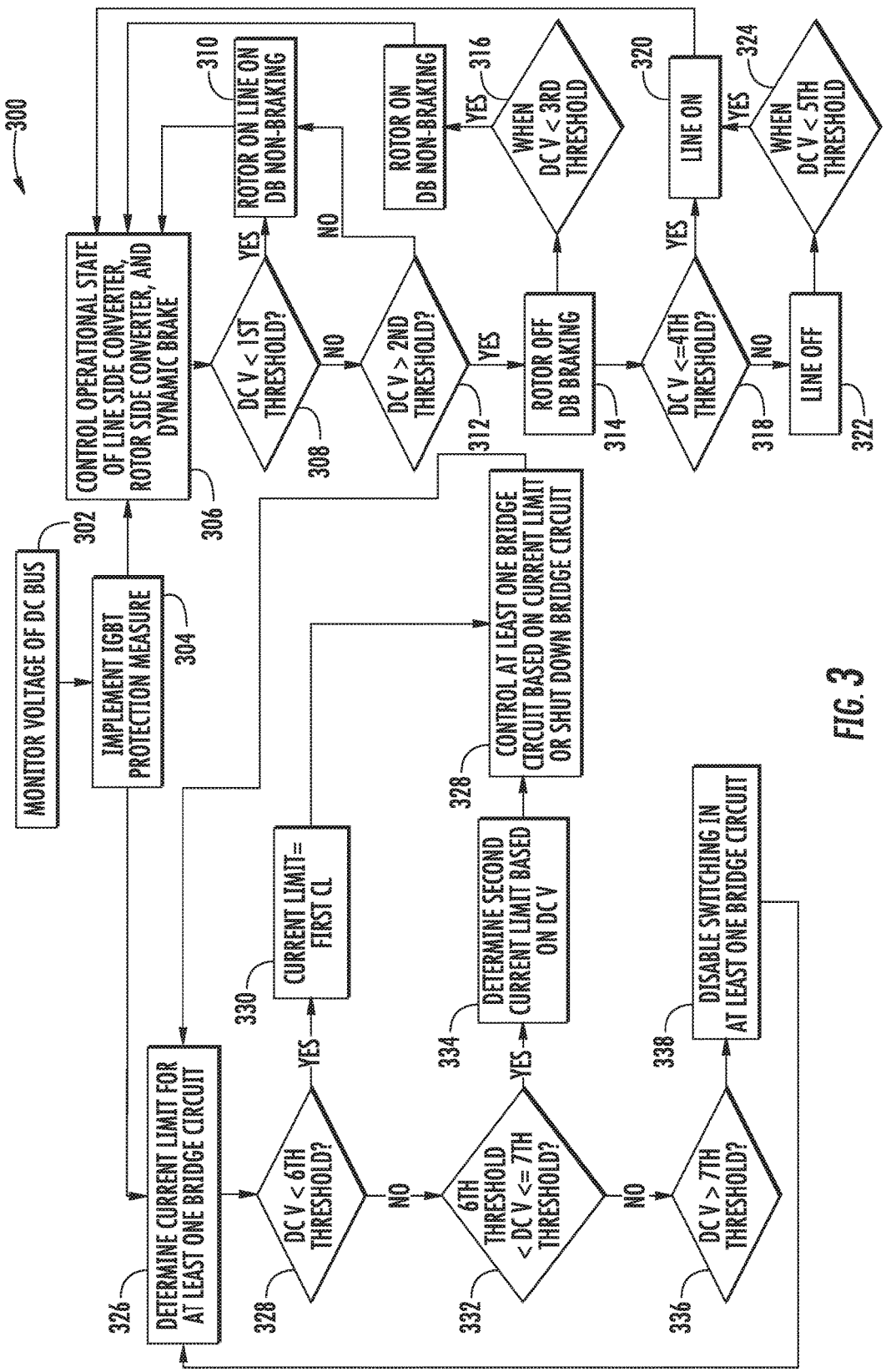
FIG. 3 depicts an example method according to example aspects of the present disclosure.

Referring now to FIG. 3, an example control method (300) for operating a power converter according to example aspects of the present disclosure is depicted. The power converter can be a power converter in a DFIG system. The DFIG system can include a DFIG generator. The power converter can include a line side converter and a rotor side converter connected by a DC bus. Each of the line side converter and a rotor side converter can include a plurality of bridge circuits. Each of the bridge circuits can include a plurality of switching devices.

At (302), the method (300) can include monitoring a voltage of the DC bus of the power converter. For example, a power converter 162 can include a DC bus 136. A voltage measurement device, such as a voltage sensor, can be configured to periodically measure the voltage across the DC bus 136. The voltage sensor can be configured to provide one or more signals indicative of a voltage to a control device, such as a control device 174. In this way, the control device 174 can monitor the voltage of the DC bus of the power converter 162.

At (304), the method (300) can include implementing a switching device protection measure based at least in part on the voltage of the DC bus of the power converter. The switching device protection measure can be operable to protect the switching devices by operating the switching devices within a safe operating area. For example, a control device 174 can be configured to implement a switching device protection measure based on the voltage of the DC bus 136. The specific switching device protection measure implemented by the control device 174 can be, for example, determined based on one or more parameters of the DFIG system 100. The switching device protection measure can operate the switching devices within a safe operating area by limiting an overvoltage or overcurrent situation.

For example, the DFIG system can include a dynamic brake, such as a dynamic brake 142, connected to the DC bus of the power converter. The dynamic brake 142 can be configured to be operated in either a braking state or a non-braking state. When operated in the braking state, energy on the DC bus can be dissipated in the dynamic brake. When operated in the non-braking state, energy on the DC bus is not dissipated in the dynamic brake.

At (306), the method (300) can include controlling each of the line side converter, the rotor side converter, and the dynamic brake to a respective operational state based at least in part on the voltage of the DC bus. For example, a control device 174 can be configured to control the rotor side converter 166 and the line side converter 168 to a respective on or off state in which switching is either enabled or disabled in the plurality of bridge circuits in the respective converter. Further, the control device 174 can be configured to control the dynamic brake 142 to either a braking state or a non-braking state in which energy on the DC bus is either dissipated in the dynamic brake or not. The control device can be configured to control the rotor side converter 166, the line side converter 168, and dynamic brake 142 based at least in part on the voltage of the DC bus 136.

For example, at (308), the method (300) can include checking whether the voltage of the DC bus 136 is below a first threshold. The first threshold can be, for example, a first threshold associated with a normal mode of operation of the power converter 162. In one or more embodiments, the first threshold can be a voltage of approximately 1175 V. If the voltage of the DC bus 136 is less than the first threshold, at (310) the control device 174 can control the rotor side converter 166 and the line side converter 1682 and on state, and can control the dynamic brake 1422 a non-braking state. In this mode of operation, switching can be enabled in both the rotor side converter 166 and the line side converter 168 thereby allowing power from the rotor of the DFIG 120 to be converted by the power converter 162. Further, energy on the DC bus 136 will not be dissipated in the dynamic brake 142.

If, however, the voltage of the DC bus 136 is not less than the first threshold, at (312), the method (300) can include determining whether the voltage of the DC bus 136 is greater than a second threshold. The second threshold can be, for example, a voltage of 1225 V. If the voltage of the DC bus 136 is not greater than the second threshold, then the rotor side converter 166 and the line side converter 168 can continue to be operated in the on state, and the dynamic brake 142 can continue to be operated in the non-braking state. In some embodiments, when the voltage of the DC bus 136 is between the first threshold and the second threshold, the dynamic brake can be operated in, for example, a PWM mode (i.e., intermittently in the braking and non-braking states) while the line side and rotor side converters are operated in the on state. If, however, the voltage of the DC bus 136 is greater than the second threshold, at (314), the method (300) can include controlling the rotor side converter 166 to an off state and controlling the dynamic brake 142 to a braking state by the control device 174. In this mode of operation, switching will be disabled in the rotor side converter 166, and energy on the DC bus 136 will be dissipated in the dynamic brake 142. In the off state, the switching devices in the rotor side converter 166 can be protected by not switching the switching devices when the voltage exceeds the second threshold.

As energy is dissipated in the dynamic brake 142, the voltage of the DC bus 136 should, over time, be reduced. According to example aspects of the present disclosure, at (316) when the voltage of the DC bus 136 drops below a third threshold, the control device can control the rotor side converter 166 back to the on state, and can control the dynamic brake 142 back to the non-braking state. For example, the third threshold can be greater than the first threshold but less than the second threshold. According to example aspects of the present disclosure, the third threshold can be a threshold of 1200 V. As energy from the DC bus 136 is dissipated in the dynamic brake 142, the voltage of the DC bus can decrease, and when the voltage drops below the third threshold, the dynamic brake 142 can be controlled to a non-braking state so that no additional energy is dissipated in the dynamic brake 142, and the rotor side converter 166 can be controlled back to an on state.

Returning to (314), the method (300) can also include at (318) determining whether the voltage of the DC bus 136 is less than or equal to a fourth threshold. The fourth threshold can be a threshold greater than the second threshold. For example, the fourth threshold can be a voltage of 1275 V. When the voltage of the DC bus 136 is less than or equal to the fourth threshold, at (320) the control device 174 can control the line side converter 168 to the on state. In the on state, switching in the line side converter 168 can be enabled, thereby allowing energy on the DC bus 136 to be converted from a DC voltage to an AC voltage and provided to an electrical grid 184.

If, however, at (318) the voltage of the DC bus 136 is greater than the fourth threshold, at (322), the method (300) can include controlling the line side converter 168 to the off state by the control device 174. In the off state, the switching devices in the line side converter 166 can be protected by not switching the switching devices when the voltage exceeds the fourth threshold. Further, because the fourth threshold is greater than the second threshold, the dynamic brake 142 will be in a braking state and therefore dissipating energy on the DC bus 136 in the dynamic brake 142. Over time, dissipating energy from the DC bus 136 in the dynamic brake 142 should lower the voltage of the DC bus. At (324), when the DC bus voltage drops below a fifth threshold, the method (300) can include controlling the line side converter 168 back to the on state. The fifth threshold can be greater than the second threshold, and less than the fourth threshold. According to example aspects of the present disclosure, the fifth threshold can be a voltage of 1250 V. In this way, when the voltage of the DC bus 136 drops below the fifth threshold, switching in the line side converter 168 can be enabled.

Returning to (304), the method (300) can include another switching device protection measure which can be implemented by a control device 174. For example, at (326), the method can include determining a current limit for at least one bridge circuit in the power converter based at least in part on the voltage of the DC bus. For example, at least one bridge circuit in a power converter 162, such as a bridge circuit in a rotor side converter 166 or a line side converter 168, can be determined by a control device 174 based at least in part on the voltage of the DC bus 136. The current limit can be a limit such that when a current flowing through the at least one bridge circuit in the power converter exceeds the current limit, the at least one bridge circuit can be controlled by the control device 174 such that switching is disabled in the at least one bridge circuit. In this way, at (328) the at least one bridge circuit in the power converter 162 can be controlled by a control device 174 based at least in part on the current limit.

Figure 4:
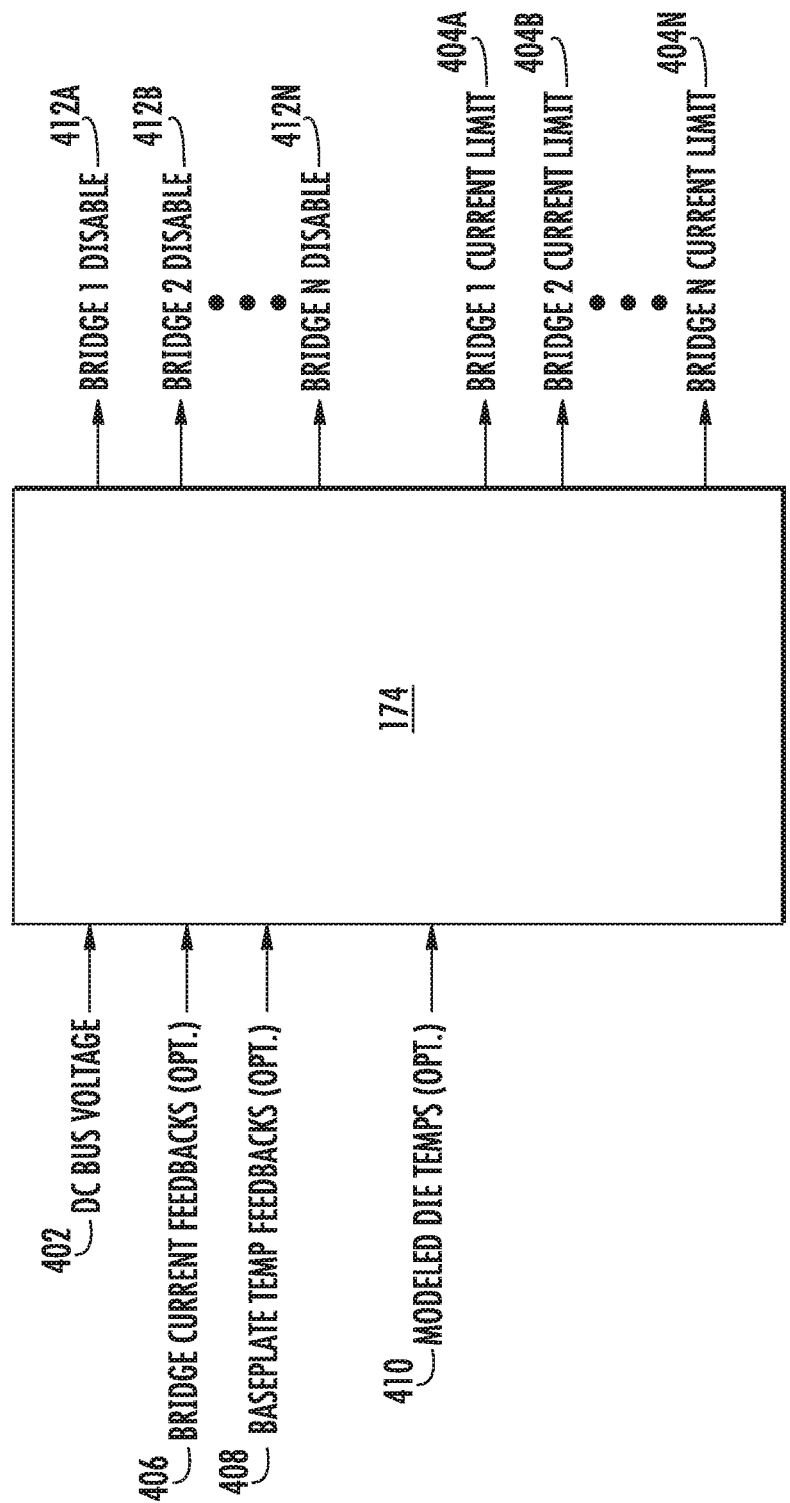
FIG. 4 depicts an example block diagram of a control scheme according to example aspects of the present disclosure.

Referring now to FIG. 4, a block diagram of an example control scheme according to example aspects of the present disclosure is depicted. As shown, a switching device protection measure can include a plurality of inputs. For example, as discussed herein, a control device 174 can be configured to receive data indicative of a voltage of a DC bus 402. Further, as discussed herein, a control device 174 can be configured to determine a current limit 404 for at least one bridge circuit. Moreover, according to example aspects of the present disclosure, a control device 174 can further be configured to determine a current limit for each bridge circuit in a power converter 162. For example, as shown in FIG. 4, a control device 174 can determine a first bridge current limit 404A, a second bridge current limit 404B, and an Nth bridge current limit 404N. Further, the control device 174 can be configured to control each bridge circuit in the power converter 162 based at least in part on the current limit for each respective bridge circuit. For example, the control device 174 can take measures to reduce a current flowing through the at least one bridge circuit in order to operate the at least one bridge circuit below the current limit for the at least one bridge circuit. If, however, the control device 174 is unable to control the current in the at least one bridge circuit below the current limit, the control device 174 can disable the at least one bridge circuit.

As shown in FIG. 4, the control device 174 can further be configured to determine one or more bridge circuit current limits 404 based upon additional parameters. For example, a control device 174 can further be configured to receive one or more bridge current feedbacks 406. The bridge current feedbacks 406 can be, for example, current flowing through one or more bridge circuits in a power converter 162. The control device 174 can similarly be configured to receive one or more temperature feedbacks, such as a base plate temperature feedback 408 or a modeled die temperature feedback 410. The base plate temperature feedback 408 can be, for example, a feedback provided by a temperature sensing device, such as a thermometer, which can be attached to a base plate of the power converter 162 or one of the components therein. The temperature sensing device can be configured to provide one or more signals indicative of a temperature to the control device 174. Similarly, the control device 174 can be configured to model a temperature of one or more components of the power converter 162 such as, for example, using known relationships between a voltage, current, power, and temperature of one or more components, and the effects of those parameters on various components of a power converter 162. For example, a control device 174 can be configured to model the temperature of a diode in a bridge circuit using one or more measured parameters. The temperature and current feedbacks can be used to determine the value of bridge circuit current limits 404, and/or voltages at which bridge circuit disable commands 412 are implemented. For example, at higher temperature limits, a bridge circuit current limit 404 can be set at a value that is less than a bridge circuit current limit 404 at a lower temperature limit in order to protect the switching devices in a bridge circuit from being exposed to excessive operating temperatures.

In addition to determining a bridge circuit current limit 404, the control device 174 can also be configured to determine one or more bridge disable commands 412. The one or more bridge disable commands 412 can be used, for example, to disable a bridge circuit, such as by changing a PWM gating command for normal operation to a non-switching command. The control device 174 can be configured to determine a bridge disable command 412 for each bridge circuit in a power converter 162. For example, a first bridge circuit disable command 412A, a second bridge circuit disable command 412B, and an Nth bridge circuit disable command 412N can be used to disable a first, second, and Nth bridge circuits, respectively. In this way, one or more bridge circuit current limits and/or bridge circuit disable commands can be determined based at least in part on a voltage of the DC bus 136, as well as additional parameters.

Referring again to FIG. 3, at (326) a control device 174 can determine a current limit for at least one bridge circuit. According to example aspects of the present disclosure, at (328), the method (300) can include whether the voltage of the DC bus 136 is less than a sixth threshold. If the voltage of the DC bus 136 is less than the sixth threshold, then at (330), the current limit can be a first current limit. For example, the first current limit can be a maximum current limit for an IGBT as determined from a product specification sheet. If the voltage of the DC bus 136 is less than the sixth threshold, the current limit for a bridge circuit can be set to the first current limit (e.g., a maximum current limit). Other current limits can similarly be used as a first current limit.

If, however, the voltage of the DC bus 136 is greater than the sixth threshold, at (332), the method (300) can include, setting the current limit at a second current limit. The second current limit can be a current limit that is less than the first current limit. For example, at (334) the method (300) can include determining the second current limit based at least in part on the voltage of the DC bus 136. For example, the second current limit can be determined based on a linear, exponential, logarithmic, step-change, or other relationship between the voltage of the DC bus 136. As the voltage of the DC bus increases, the second current limit can be reduced in order to limit the total power flow through the switching devices in a bridge circuit. If, at (336), the voltage of the DC bus is greater than a seventh threshold, at (338) the method (300) can include disabling the at least one bridge circuit. The seventh threshold can be a threshold higher than the sixth threshold. For example, above a seventh threshold, a second current limit can be essentially zero as switching can be disabled in the bridge circuit in order to prevent a current from flowing through the switching devices in the bridge circuit.

Figure 5:
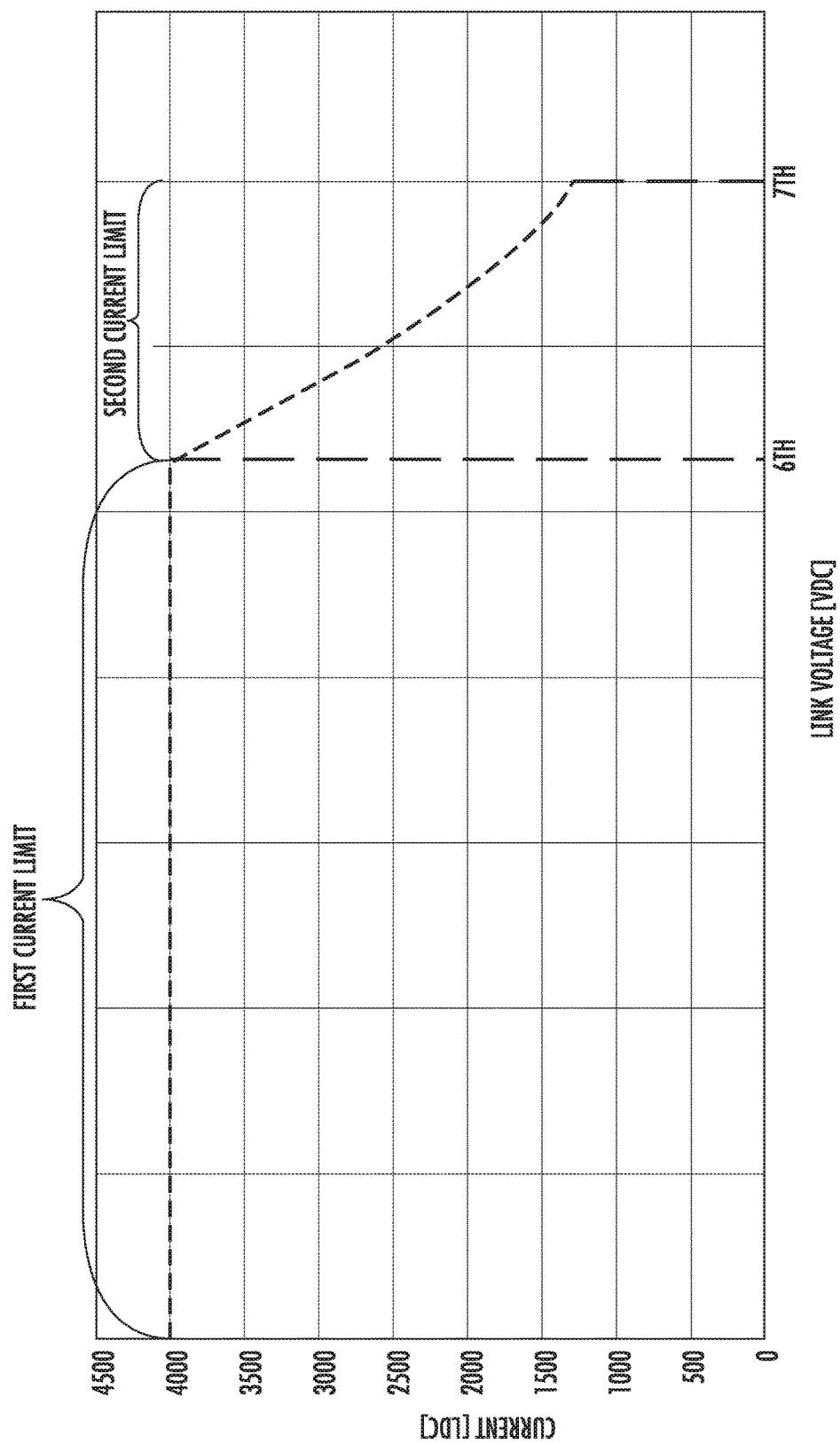
FIG. 5 depicts a graph of an example relationship between a DC bus voltage and a current limit according to example aspects of the present disclosure.

Referring now to FIG. 5, a graph depicting an example relationship between a current limit, and a voltage of the DC bus is shown. The voltage of the DC bus is shown on the X-axis, and a current limit is shown on the Y-axis. As shown, for all voltages below the sixth threshold, the current limit is set at a first current limit. The first current limit can correspond to a maximum current limit as determined based on the specifications for one or more IGBTs in a bridge circuit. However, once the voltage of the DC bus 136 exceeds the sixth threshold, the current limit can be a second current limit, which can be determined based on the voltage of the DC bus 136. For example, as shown, between different voltage ranges, different linear relationships between the second current limit and a voltage are shown. Other relationships can similarly be used, such as a single linear relationship between a current limit and a DC bus voltage, and exponential relationship, a step-change relationship, a logarithmic relationship, or any other relationship. According to additional example aspects of the present disclosure not depicted in FIG. 5, the second current limit can be a fixed current limit for all voltages above the sixth threshold. In this way, the value of the second current limit can be determined based at least upon the voltage of the DC bus 136.

Further, as shown in FIG. 5, once the voltage of the DC bus exceeds a seventh threshold, the current limit can be essentially zero. For example, switching can be disabled in the bridge circuits in order to reduce and/or eliminate the current flowing through the switching devices and/or DC bus 136. In an embodiment, the current limit can be used to trip the power converter 162 off-line such that zero current flows through the power converter. For example, one or more switches can be used to electrically isolate the power converter 162 from the rotor of the DFIG 120.

In this way, a switching device protection measure can be implemented by a control device 174 in order to protect the switching devices in one or more bridge circuits in a power converter 162. The systems and methods according to example aspects of the present disclosure can thus have a technical effect of allowing for a power converter 162 in a DFIG system 100 to be operated through a broader range of grid disturbances while protecting the switching devices in the power converter 162. Moreover, the systems and methods according to example aspects of the present disclosure can allow for operating the switching devices in a power converter 162 in order to allow for increased power throughput in the power converter 162, which can reduce the cost associated with the power converter 162 for a specific power rating.

Figure 6:
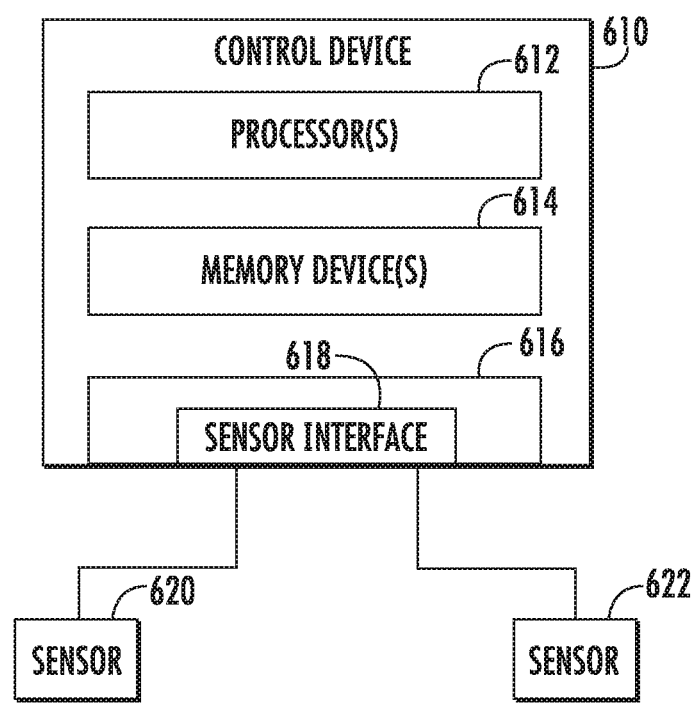
FIG. 6 depicts elements suitable for use in a control device according to example aspects of the present disclosure

FIG. 6 depicts an example control device 610 according to example embodiments of the present disclosure. The control device 610 can be, for example, a control device 174 or a control system 176, and can be associated with an DFIG wind turbine system, a wind farm (e.g., a cluster-level or farm-level control device) and/or can include one or more control devices associated with aspects of a wind turbine system, such as one or more control devices associated with a power conversion system 162. In some embodiments, the one or more control devices 610 can include one or more processor(s) 612 and one or more memory device(s) 614. The processor(s) 612 and memory device(s) 614 can be distributed so that they are located at one more locales or with different devices.

The processor(s) 612 and memory device(s) 614 can be configured to perform a variety of computer-implemented functions and/or instructions (e.g., performing the methods, steps, calculations and the like and storing relevant data as disclosed herein). The instructions when executed by the processor(s) 612 can cause the processor(s) 612 to perform operations according to example aspects of the present disclosure. For instance, the instructions when executed by the processor(s) 612 can cause the processor(s) 612 to implement the methods of FIG. 3 (300) discussed herein.

Additionally, the control device 610 can include a communication interface 616 to facilitate communications between the control device 610 and various components of a wind turbine system, wind farm, or power system, including power demand parameters or power generation setpoints as described herein. Further, the communication interface 618 can include a sensor interface 618 (e.g., one or more analog-to-digital converters) to permit signals transmitted from one or more sensors 620, 622 to be converted into signals that can be understood and processed by the processor(s) 612. It should be appreciated that the sensors (e.g. sensors 620, 622) can be communicatively coupled to the communications interface 618 using any suitable means, such as a wired or wireless connection. The signals can be communicated using any suitable communications protocol. The sensors (620, 622) can be, for example, voltage sensors, current sensors, power sensors, temperature sensors, or any other sensor device described herein.

As such, the processor(s) 612 can be configured to receive one or more signals from the sensors 620 and 622. For instance, in some embodiments, the processor(s) 612 can receive signals indicative of a voltage of a DC bus 136 from the sensor 620, such as from one or more voltage sensors. In some embodiments, the processor(s) 612 can receive signals indicative of a bridge circuit current from sensor 622.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 614 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 614 can generally be configured to store suitable computer-readable instructions that, when implemented by the processor(s) 612, configure the control device 610 to perform the various functions as described herein.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a power converter in a doubly-fed induction generator (DFIG) system, the DFIG system comprising a DFIG generator and a power converter comprising a line side converter and a rotor side converter connected by a DC bus, each of the line side converter and rotor side converter comprising a plurality of bridge circuits, each bridge circuit comprising a plurality of switching devices, the method comprising:
   monitoring, by a control device, a voltage of the DC bus;
   determining, by the control device, a current limit for at least one bridge circuit in the power converter based at least in part on the voltage of the DC bus; and
   controlling, by the control device, the at least one bridge circuit in the power converter based at least in part on the current limit,
   wherein when a current flowing through the at least one bridge circuit in the power converter exceeds the current limit, controlling, by the control device, the at least one bridge circuit in the power converter based at least in part on the current limit comprises disabling the at least one bridge circuit by the control device.

2. The method of claim 1, wherein when the voltage of the DC bus is a voltage less than or equal to a first threshold; determining, by the control device, the current limit for at least one bridge circuit in the power converter further comprises:
   setting, by the control device, the current limit at a first value.

3. The method of claim 2, wherein when the voltage of the DC bus is a voltage greater than the first threshold, determining, by the control device, a current limit for at least one bridge circuit in the power converter further comprises:
   setting, by the control device, the current limit for the at least one bridge circuit at a second value; and
   wherein the second value comprises a value less than the first value.

4. The method of claim 3, wherein the second value is determined, by the control device, based at least in part on the voltage of the DC bus.

5. The method of claim 2, wherein when the voltage of the DC bus exceeds a second threshold, controlling, by the control device, the at least one bridge circuit in the power converter based at least in part on the current limit further comprises:
   disabling the at least one bridge circuit by the control device.

6. The method of claim 1, wherein determining a current limit for at least one bridge circuit in the power converter further comprises:
   determining, by the control device, a current limit for each bridge circuit in the power converter; and
   controlling the at least one bridge circuit in the power converter based at least in part on the current limit further comprises:
   controlling, by the control device, each bridge circuit in the power converter based on the respective current limit for each bridge circuit.

7. A control system for a doubly-fed induction generator (DFIG) system, the DFIG system comprising at least a DFIG generator and a power converter comprising a line side converter and a rotor side converter connected by a DC bus, each of the line side converter and rotor side converter comprising a plurality of bridge circuits, the control system comprising:
   a control device configured to perform operations, the operations comprising:
   determine a voltage of the DC bus;
   determine a current limit for at least one bridge circuit in the power converter based at least in part on the voltage of the DC bus; and
   control the at least one bridge circuit in the power converter based at least in part on the current limit;
   wherein when a current flowing through the at least one bridge circuit in the power converter exceeds the current limit, controlling the at least one bridge circuit in the power converter based at least in part on a current limit comprises disabling the at least one bridge circuit.

8. The control system of claim 7, wherein when the voltage of the DC bus is a voltage less than or equal to a first threshold; determining a current limit for at least one bridge circuit in the power converter comprises setting the current limit at a first value.

9. The control system of claim 8, wherein when the voltage of the DC bus is a voltage greater than the first threshold, determining a current limit for at least one bridge circuit in the power converter comprises setting the current limit for the at least one bridge circuit at a second value; and
wherein the second value comprises a value less than the first value.

10. The control system of claim 9, wherein the second value is determined based at least in part on the voltage of the DC bus.

11. A doubly fed induction generator (DFIG) system, comprising:
a DFIG generator;
a power converter comprising a line side converter and a rotor side converter connected by a DC bus, each of the line side converter and rotor side converter comprising a plurality of bridge circuits, each bridge circuit comprising a plurality of switching devices;
a dynamic brake connected to the DC bus; and
a control device configured to perform operations, the operations comprising:
monitor a voltage of the DC bus of the power converter; and
control each of the line side converter, the rotor side converter, and the dynamic brake to a respective operational state based at least in part on the voltage of the DC bus;
wherein the operational state for the line side converter and the rotor side converter comprises either an on state or an off state,
wherein when operated in the on state, switching is enabled in the plurality of bridge circuits of the respective converter;
wherein when operated in the off state, switching is disabled in the plurality of bridge circuits of the respective converter;
wherein the operational state for the dynamic brake comprises either a braking state or a non-braking state;
wherein energy on the DC bus is dissipated in the dynamic brake in the braking state; and
wherein energy on the DC bus is not dissipated in the dynamic brake on the non-braking state.

12. The DFIG system of claim 11, wherein when DC bus voltage is below a first threshold, controlling, by the control device, each of the line side converter, the rotor side converter, and the dynamic brake to a respective operational state based at least in part on the voltage of the DC bus comprises controlling the line side converter and the rotor side converter to the on state and controlling the dynamic brake to the non-braking state;
wherein when the DC bus voltage is above a second threshold, controlling, by the control device, the rotor side converter and the dynamic brake to a respective operational state comprises controlling the rotor side converter to the off state and controlling the dynamic brake to the braking state;
wherein when the DC bus voltage is less than or equal to a third threshold, controlling, by the control device, the line side converter to a respective operational state comprises controlling the line side converter to the on state;
wherein when the DC bus voltage is greater than the third threshold, controlling by the control device, the line side converter to a respective operational state comprises controlling the line side converter to the off state.
wherein the second threshold is greater than the first threshold; and
wherein the third threshold is greater than the second threshold.

13. The DFIG system of claim 12, wherein following the control device controlling the rotor side converter to the off state and controlling the dynamic brake to the braking state, when the DC bus voltage drops below a fourth threshold, the control device is further configured to control the rotor side converter to the on state and control the dynamic brake to the non-braking state;
wherein the fourth threshold is greater than the first threshold and less than the second threshold.

14. The DFIG system of claim 12, wherein following the control device controlling the line side converter to the off state, when the DC bus voltage drops below a fourth threshold, the control device is further configured to control the line side converter to the one state;
wherein the fourth threshold is greater than the second threshold and less than the third threshold.

* * * * *